Nov. 30, 1948.  P. SCHMADLEWSKY  2,455,096
RETOUCHING FRAME

Filed Nov. 23, 1945  2 Sheets-Sheet 1

Inventor
Paul Schmadlewsky
Clarence A. O'Brien
and Harvey B. Jacobson
Attorneys

Nov. 30, 1948. P. SCHMADLEWSKY 2,455,096
RETOUCHING FRAME
Filed Nov. 23, 1945 2 Sheets-Sheet 2
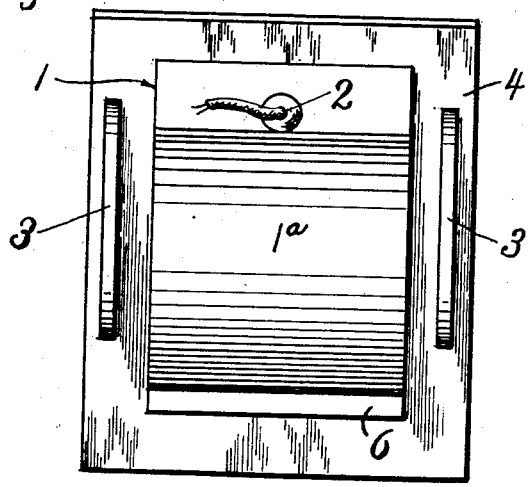
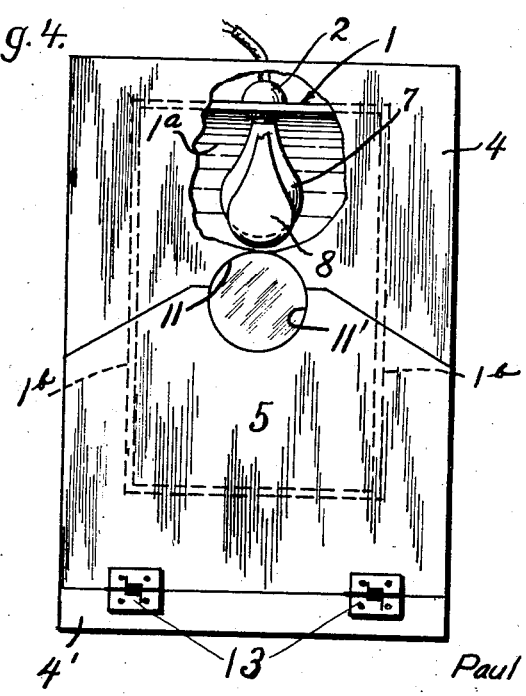
Inventor
Paul Schmadlewsky
Clarence A. O'Brien
and Harvey B. Jacobson
Attorneys Patented Nov. 30, 1948

2,455,096

UNITED STATES PATENT OFFICE 2,455,096

RETOUCHING FRAME

Paul Schmadlewsky, Portland, Oreg.

Application November 23, 1945, Serial No. 630,484

2 Claims. (Cl. 95—102)

The present invention relates to device employed in retouching photographic negatives, and particularly to devices of this kind embodying a supporting plate on which the work is adapted to be mounted for being illuminated from the rear.

Retouching frames of the above type are usually illuminated by the direct light from an incandescent lamp located behind a translucent supporting plate or screen, so that poor vision and glare result, and the supporting plate or screen becomes uncomfortably hot.

The primary object of the present invention is to overcome the above mentioned objections to prior retouching frames. In order to overcome poor vision, I provide an opaque negative supporting plate having a clear opening through which the light rays may pass to the photographic negative without being subdued or refracted. In order to avoid glare, the incandescent lamp is mounted in the chamber of a reflector outside the perimeter of the opening in the opaque supporting plate and disposed in front of the incandescent lamp to prevent passage of rays directly from the lamp through the opening in the supporting plate. In order to prevent undue heating of the frame and the negative, efficient means is provided to facilitate circulation of cooling air through the frame in contact with the rear or inner surface of the supporting plate, while preventing objectionable escape of light from the frame.

Other objects of the invention are to provide a retouching frame in the form of a stand having means to support the same upon the top of a table or the like so that the negative supporting plate is inclined forwardly in the most desirable position; and to provide a spring pressed hinged clamping plate for clamping the photographic negative on the negative supporting plate and for affording a surface on which the hand of the user may rest out of contact with the photographic negative while retouching the latter.

The exact nature of the present invention will become apparent from the following description when considered in connection with the accompanying drawings, in which:

Figure 3 is a rear elevational view of the frame shown in Figure 1.

Figure 4 is a front elevational view thereof, partly broken away.

In the illustrated embodiment of the invention, 1 indicates a hollow open front reflector hood, the top, back and bottom of which is formed by a concaved wall 1a, and which has end walls 1b.

Figure 1:
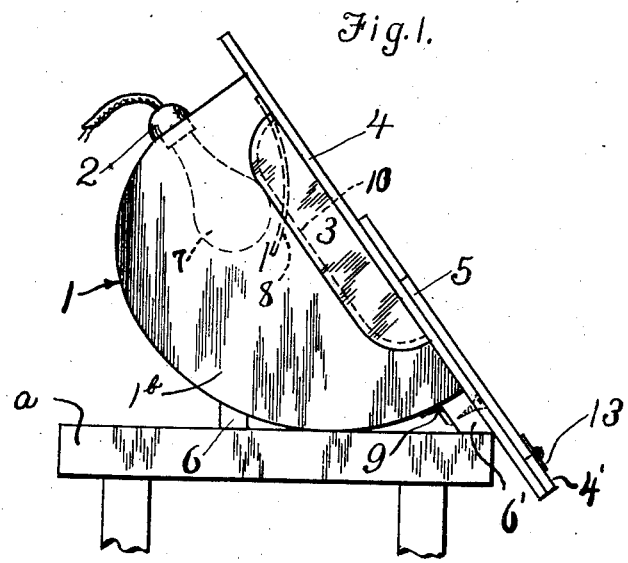
Figure 1 is a side elevational view of a retouching frame constructed in accordance with the present invention and operatively disposed upon the top of the table.
Figure 2:
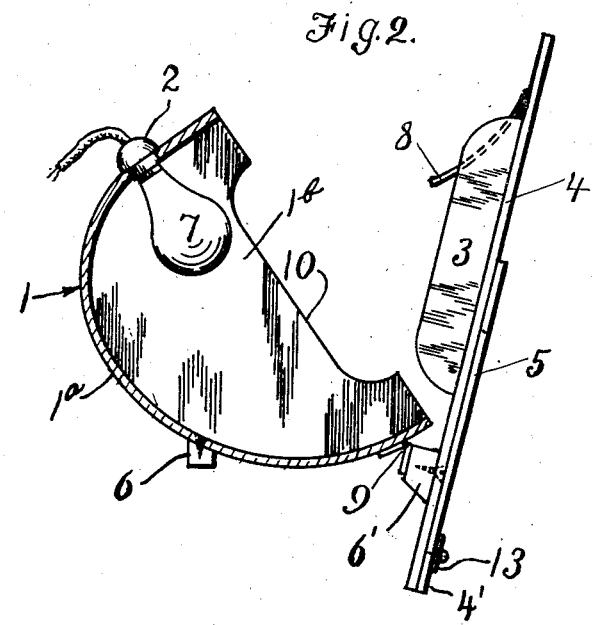
Figure 2 is a view of the frame shown in Figure 1, partly in vertical section and partly in side elevation, with the negative supporting or cover plate swung to open position.

The reflector hood 1 is closed at the front by means of a flat cover plate 4 which is of greater area than the front of the reflector hood, a transverse supporting bar 6 is secured across the lower portion of the concave wall 1a of the reflector hood near the rear of the latter, and a somewhat similar bar 6' is secured across the plate 4 near its lower end. The bar 6' is hinged to the bottom of the concave wall 1a adjacent the front of the reflector hood to mount the cover plate 4 for swinging forwardly to open position as illustrated in Figure 2. The bars 6 and 6' may be formed and arranged as to rest upon the top a of a table or the like so as to support the reflector hood in a rearwardly tilted position with the cover plate 4 inclined forwardly when in closed position as shown in Figure 1. When thus supported, the frame is disposed so that the cover plate 4 projects downwardly past an edge of the table top a, thus engaging the edge of the table top and preventing rearward displacement of the frame when in use. It will be noted that the plate 4 projects beyond the top, bottom and sides of the reflector hood.

Carried by the concaved wall 1a of the reflector hood is a lamp socket 2 which receives an incandescent electric lamp 7 located within the reflector hood. The end walls 1b of the reflector hood are cut away as at 10 at their forward edges so as to permit passage of air into and out of the reflector hood behind the plate 4. Air is thus permitted to circulate through the frame across the inner face of the plate 4 so that the latter is not unduly heated by the lamp 7.

The plate 4 is provided with rearwardly projecting shields 3 in the form of flat elongated plates which are spaced from the sides 1b of the reflector hood 1 and overlie the cut-outs or notches 10 so as to not interfere with circulation of air through the frame and at the same time intercept any rays of light passing out of the reflector hood through the notches or cut-outs 10.

The cover plate 4 forms a supporting plate for the photographic negative to be retouched, and it has a substantially central restricted opening 11 which is clear and through which the rays of light pass to the negative when the latter is placed on the outer surface of plate 4 over opening 11. The opening 11 is relatively restricted so that only a desired portion of the negative is illuminated at a time. There is no translucent screen for the opening 11 to subdue the rays of light passing therethrough to the negative. Attached at its upper end to the rear or inner-surface of the plate 4 is a glare shield 8 which curves rearwardly and downwardly in front of and below the lamp 7 and is of sufficient size to intercept any direct rays of light from the lamp 7 which might pass from the latter directly to and through the opening 11. Thus, the only rays of light permitted to pass to and through the opening 11 are indirect rays from the lamp 7 which strike the inner surfaces of the reflector hood and are then reflected to the opening 11. In this way, objectionable glare is prevented although sufficient illumination of the negative is had to insure clear vision such as is required for efficient retouching. It will be noted that the lamp 7 and shield 8 are located above or outside the perimeter of the opening 11 to permit a maximum number of reflected rays to pass to such opening.

The photographic negative is held in a flat condition over the opening 11 by means of a hinged spring pressed clamping plate 5 having a notch 11' centrally of its free upper edge which conforms to and coincides with the major lower portion of the opening 11 when the plate 5 is in clamping position. The clamping plate 5 is hinged by means of spring hinges 13, at its lower edge, to a raised portion 4' provided across the lower end of the plate 4. As the clamping plate 5 embraces a considerable portion of the opening 11, it provides a surface on which the user of the frame may conveniently rest his hand, out of contact with the negative, when retouching the latter.

In using the present frame, the parts are disposed as shown in Figure 1 and the clamping plate 5 is swung forwardly away from the cover plate 4 so that the photographic negative may be placed upon the plate 4 over the opening 11. The clamping plate 5 is then released so that it will be swung by its spring hinges toward the plate 4 and against the photographic negative, thereby securely clamping the latter in a flat condition and in position over the opening 11. With the lamp 7 lighted, the reflected rays of light will pass through the opening 11 and notch 11' and thereby effectively illuminate the portion of the negative exposed through said opening 11 and notch 11'. As the opening 11 is clear in that no translucent screen is used therein, and as no direct rays of light may pass through the opening 11 from the lamp 7, clear vision devoid of glare is insured. A lamp of low candle power may be employed which emits comparatively little heat, and this, combined with the free circulation of air through the frame insures against undue heating of the plate 4 or the negative disposed thereon. Thus, the retouching operation may be performed in complete comfort. Due to the fact that the user exerts downward pressure on the frame when retouching the negatives, the projecting lower portion of the plate 4 contacting the edge of the table top a will effectively prevent accidental rearward displacement of the frame so that the latter will remain in proper position while in use and resting on the table top.

From the foregoing description, it is believed that the construction, manner of use, and advantages of the present invention will be readily understood and appreciated by those skilled in the art. The device is extremely simple and compact in construction, and is so constituted as to effectively carry out the stated objects of the invention. Minor changes and modifications may be made in the invention as illustrated and described, such as fall within the scope of the invention as claimed.

What I claim is:

1. A retouching frame comprising an open-front reflector hood, an opaque cover plate hinged to the bottom of said hood for swinging forwardly to open position, supporting means to support said hood on a horizontal surface in a rearwardly tilted position with the cover plate inclined forwardly, said cover plate having a small opening disposed centrally of the front of said hood, a source of light arranged within the top of said hood outside the perimeter of said opening, a glare shield attached to the inner side of said cover plate and extending downwardly and rearwardly in front of said source of light, and means to secure a photographic negative in a flat condition on the front of said cover plate over said opening, said supporting means comprising a transverse bar secured across the bottom of said hood near the rear of the latter and a second transverse bar hinged to the bottom and near the front of said hood and having the cover plate fixed thereto, said cover plate projecting below said bars and the bottom of said hood.

2. A retouching frame comprising a hollow open-front reflector hood including flat side walls and a concaved wall forming the top, back and bottom of the hood, transverse front and rear supporting bars secured on the bottom of the reflector hood for supporting the latter on a horizontal supporting surface in a rearwardly tilted position, a flat forwardly inclined opaque cover plate for the front of the reflector hood fixed to and projecting below the front supporting bar, said front supporting bar being hinged to the bottom of the reflector hood near the front of the latter to permit forward swinging of the cover plate to open position, said cover plate being provided with a small substantially central clear opening over which a restricted portion of the negative may be exposed for being illuminated while being retouched, and a source of light within the reflector hood.

PAUL SCHMADLEWSKY.

REFERENCES CITED

The following references are of record in the file of this patent:

UNITED STATES PATENTS

| Number | Name | Date |
| --- | --- | --- |
| 1,611,433 | Gorretta | Dec. 21, 1926 |
| 1,668,589 | Hall | May 8, 1928 |
| 2,125,613 | Hjort | Aug. 2, 1938 |
| 2,300,264 | Morin | Oct. 27, 1942 |